(12) United States Patent
Shih et al.

(10) Patent No.: US 7,258,488 B2
(45) Date of Patent: Aug. 21, 2007

(54) FLUID BEARING MODULE

(75) Inventors: Wun-Chang Shih, Hsinchu (TW); Ching-Hsing Huang, Hsinchu (TW); Yu-Hsiu Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 697 days.

(21) Appl. No.: 10/726,549

(22) Filed: Dec. 4, 2003

(65) Prior Publication Data

US 2005/0069235 A1 Mar. 31, 2005

(30) Foreign Application Priority Data

Sep. 26, 2003 (TW) ............................... 92126745 A

(51) Int. Cl.
*F16C 32/06* (2006.01)
(52) U.S. Cl. .................... 384/119; 384/103; 384/903; 403/291
(58) Field of Classification Search ............... 384/119, 384/130, 150–153, 295, 296, 100, 144, 226, 384/246, 903, 103; 403/316, 326, 291, 397; 310/90
See application file for complete search history.

(56) References Cited

U.S. PATENT DOCUMENTS 3,663,849 A * 5/1972 Heob ........................... 310/90
3,726,575 A * 4/1973 Moorman .................... 384/420
5,258,672 A * 11/1993 Wrobel ......................... 310/42
6,316,856 B1 * 11/2001 Kusaki et al. ................ 310/90
6,771,460 B2 * 8/2004 Nii et al. .................. 360/99.08

FOREIGN PATENT DOCUMENTS

DE 198 48 291 * 4/1999

* cited by examiner

*Primary Examiner*—William C. Joyce
(74) *Attorney, Agent, or Firm*—Birch, Stewart, Kolasch & Birch, LLP

(57) ABSTRACT

A fluid bearing module has a bearing seat, a bearing, a deflecting member, and an impediment. The bearing seat has a capacity with an opening. The bearing in the capacity has a hollow space for the axis of a rotor to go through, and a lubricant medium is filled in between. The deflecting member protruding from the side near the opening of the bearing seat bends toward the capacity and clips on the rotor axis. The impediment protrudes from the side near the opening of the bearing seat for preventing the deflecting member from bending toward the opening and departing from the rotor. Moreover, the deflecting member and the impediment form a maze to keep the lubricant medium within.

5 Claims, 10 Drawing Sheets

FLUID BEARING MODULE

This Nonprovisional application claims priority under 35 U.S.C. § 119(a) on patent application Ser. No. 092126745 filed in TAIWAN on Sep. 26, 2003, the entire contents of which are hereby incorporated by reference.

BACKGROUND OF THE INVENTION

1. Field of Invention

The invention relates to a fluid bearing module for rotating devices and, in particular, to a fluid bearing module that has the functions of preventing the lubricant medium from leaking and the deflecting member from getting loose.

2. Related Art

The bearings are used in rotating devices to provide support, to reduce friction, and to withstand loads. As modern devices are getting smaller and become compact, the precision requirement on the bearing is also getting higher. The most commonly used ball bearings thus have higher cost than before. For example, for the ball bearings used in motors, the cost is above one third of the total cost of the motor. Therefore, the cost for miniaturization is too high. Moreover, if the ball bearing has any defect, there will be such problems as high noises and insufficient precision during the operation of the rotating device. In particular, when the ball bearings are used in the optical disc drive motors, the instability caused by the bearings with low precision is likely to result in errors when the optical disc drive is reading a high density storage medium. As the ball bearings cannot simultaneously satisfy the requirements of miniaturization, high precision, and low cost, people have invented fluid bearings that can reduce rotational friction, have high precision, low noises, and are resistant to vibrations.

Generally speaking, in order not to let the lubricant medium leak out of the bearings, there are two designs: dynamical anti-leaking and static anti-leaking.

The dynamical anti-leaking design of the fluid bearings is to make a human-shape micro groove (see FIGS. 1 and 2). The micro groove is filled with a lubricant medium. When the fluid bearing is rotating, the lubricant medium inside the micro groove is driven to flow along the concave part of the micro groove. Therefore, during the rotation of the fluid bearing, the lubricant medium is limited to the concave part of the micro groove, serving it lubrication function. As the pressure on the central part of the fluid bearing is larger, it does not wiggle much and the lubricant medium does not flow out of the fluid bearing, either. The lubricant medium is thus sealed inside the fluid bearing. Therefore, the fluid bearings can be used in high-precision products. Moreover, as the lubricant medium is kept in the concave part of the micro groove, it has the advantages of reducing rotational friction, noises, and vibrations. They are ideal for the motors of information appliances, hard disc drives (HDD's) and optical disc drives The static anti-leaking design of the fluid bearing is shown in FIG. 1. A gap L between the rotating device and the fluid bearing (about 2 to 16 micrometers) is employed so that under its static state the lubricant medium is kept between the rotating device and the fluid bearing through its surface tension. The smaller the gap is, the larger surface tension the lubricant medium has. Therefore, only high-precision products (such as HDD's) can use such a static anti-leaking design. When shipping low-precision products from one place to another for assembly, the lubricant medium is likely to flow out of the fluid bearing in this case. Besides, the lubricant medium can easily flow out of the fluid bearing when the product is placed up side down.

In addition, after assembling the rotating device and the fluid bearing, one has to rely on an anti-plug design so that the rotating device will not get loose during the shipping. Most of current designs fix the relation between the rotating device and the fluid bearing using an external mechanism after the rotating device and the fluid bearing are assembled. However, such a method involves very complicated element designs.

SUMMARY OF THE INVENTION

An objective of the invention is to provide a fluid bearing module so that the axis of a rotor can be readily mounted onto a bearing and cannot be easily departed from the bearing.

Another objective of the invention is to provide a fluid bearing module with a maze channel to prevent the lubricant medium from leaking.

The disclosed fluid bearing module includes a bearing seat, a bearing, a deflecting member, and an impediment. The bearing seat can be selectively installed on a stator. The bearing seat has a capacity with an opening. The bearing in the capacity has a hollow space for the axis of a rotor to go through, and a lubricant medium is filled in between. The deflecting member protruding from the side near the opening of the bearing seat bends toward or away from the capacity and clips on the rotor axis. The impediment protrudes from the side near the opening of the bearing seat. Its inner diameter is greater than that of the deflecting member for preventing the deflecting member from bending toward the opening and departing from the rotor. Moreover, the deflecting member and the impediment form a maze to keep the lubricant medium within.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The invention discloses a fluid bearing module 30 used in motors that output rotational energy. The fan shown in FIG.

3 includes a rotor 10, a stator 20, and a fluid bearing module 30. The rotor 10 is fixed onto the stator 20 by the fluid bearing module 30. The rotor 10 includes several blades installed on its rim. Its inner ring is provided with a permanent magnet. It is installed on the fluid bearing module 30 via an axes 11 and fixed at the center of the stator 20. The stator 20 has a coil winded on several magnetic poles formed on several silicon steel blades. When an electrical current flows through the coil, the magnetic poles produce magnetic forces to repel from the magnetic poles on the stator 20. Therefore, the rotor 10 starts to rotate and outputs rotational energy. Since this portion belongs to the prior art, we do not describe in further detail here.

Figure 2:
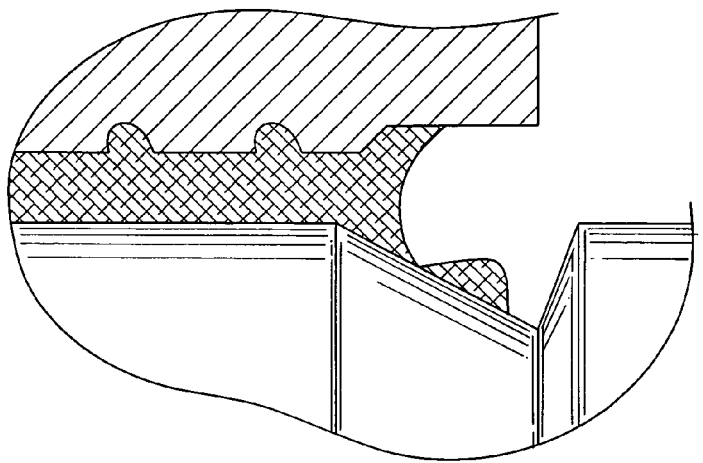
FIG. 2 is another schematic view of the fluid bearing in the prior art.
Figure 1:
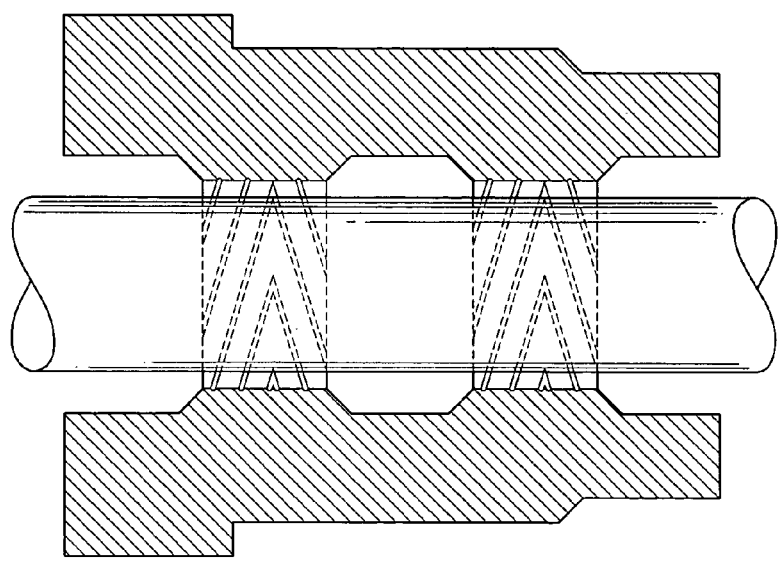
FIG. 1 is a schematic view of the fluid bearing in the prior art.
Figure 3:
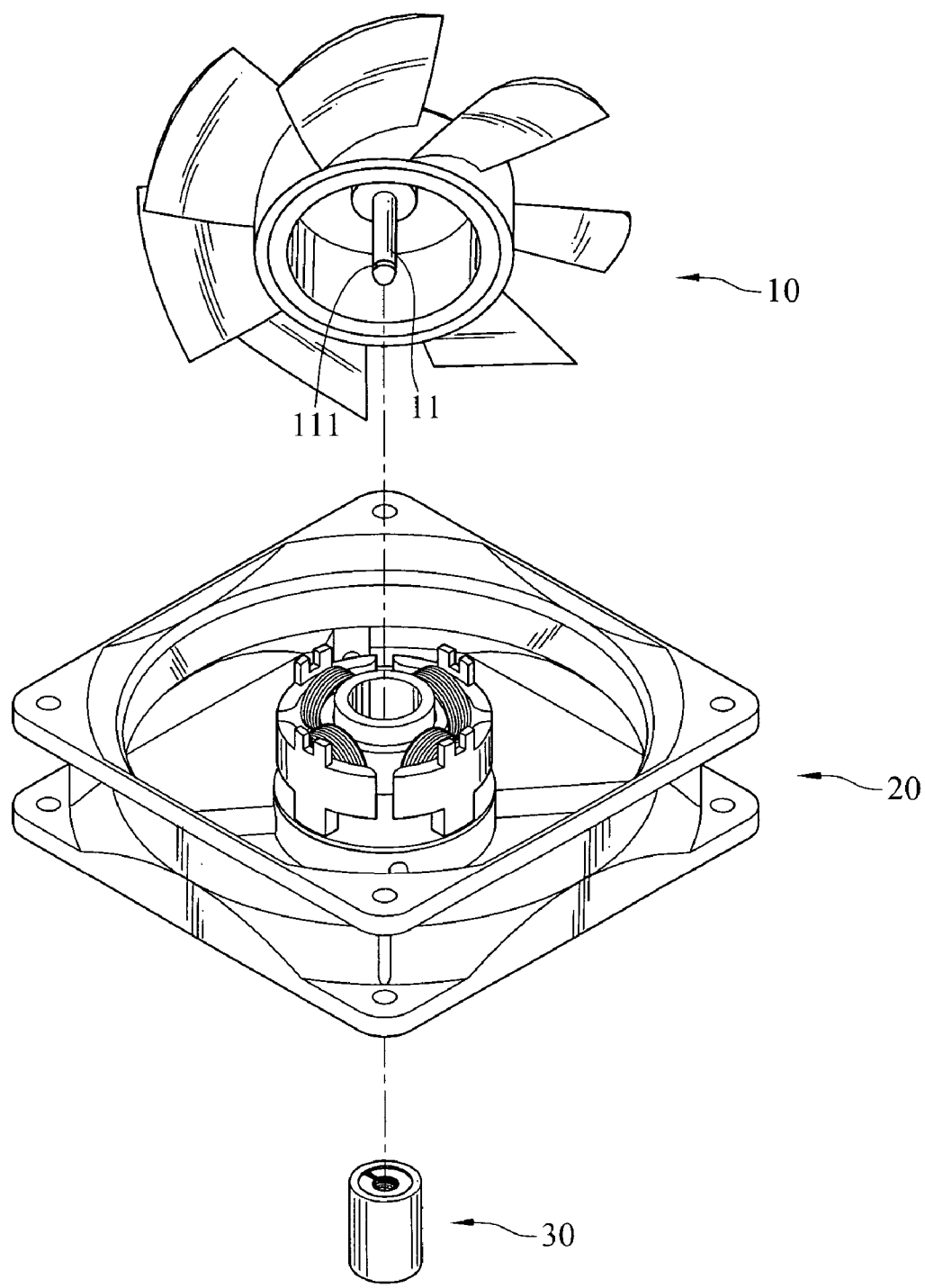
FIG. 3 is a schematic view the invention applied to a fan.
Figure 4:
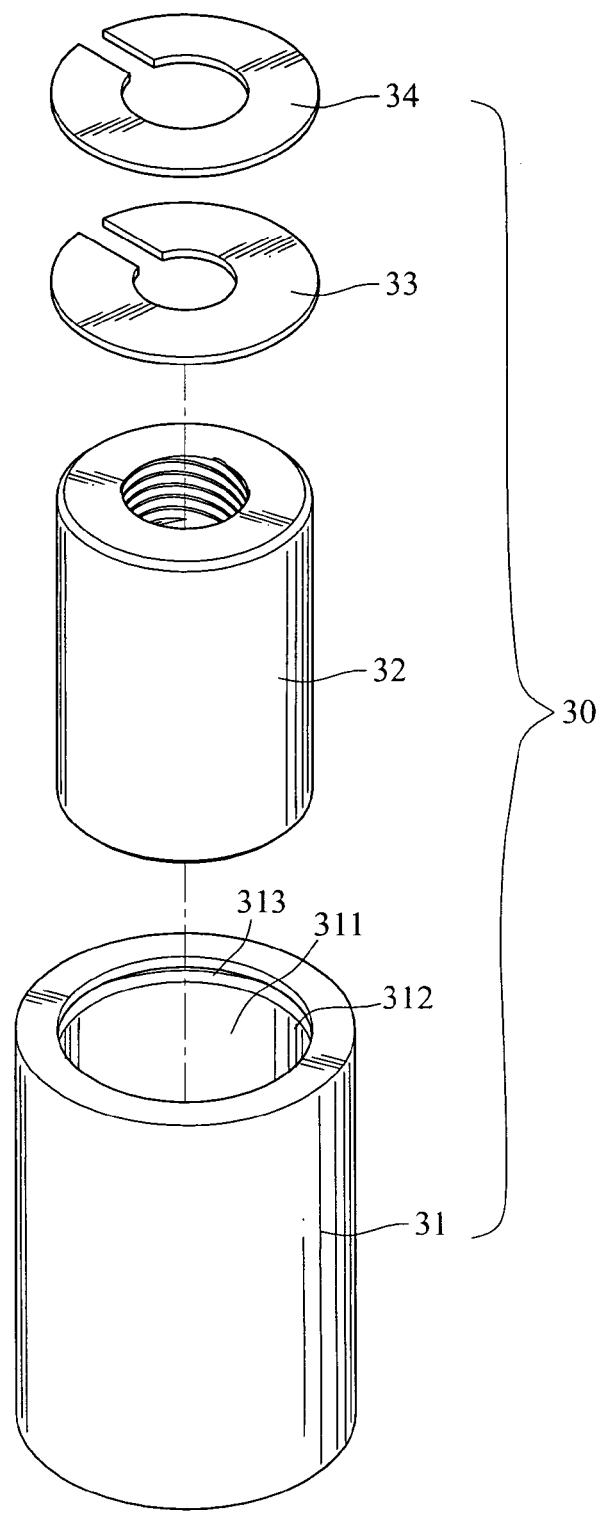
FIG. 4 is an exploded view of the invention.

The fluid bearing module 30 shown in FIGS. 3 and 4 includes a bearing seat 31, a bearing 32, a deflecting member 33, and an impediment 34. The bearing seat 31 can be selectively installed on a stator 20. The bearing seat 31 has a capacity 311 with an opening 312. The bearing 32 in the capacity 311 has a hollow space for the axis 11 of the rotor 10 to go through, and a lubricant medium (not shown) is filled between the bearing 32 and the rotor 10. The rotator 10 is connected to the stator 20 in a rotatable way. The deflecting member 33 is a buckle and protrudes from an annular groove 313 on the side of the opening 312 of the bearing seat 31. The deflecting member 33 bends toward or away from the capacity 311. The impediment 34 is also a buckle and has a less deflecting ability than the deflecting member 33. It protrudes from the annular groove 313 on the side of the opening 312 of the bearing seat 31. Its inner diameter is slightly greater than that of the deflecting member 33 for preventing the deflecting member 33 from bending toward the opening 312 and departing from the rotor. Moreover, the deflecting member 33 and the impediment 34 form a maze to keep the lubricant medium within.

Figure 5:
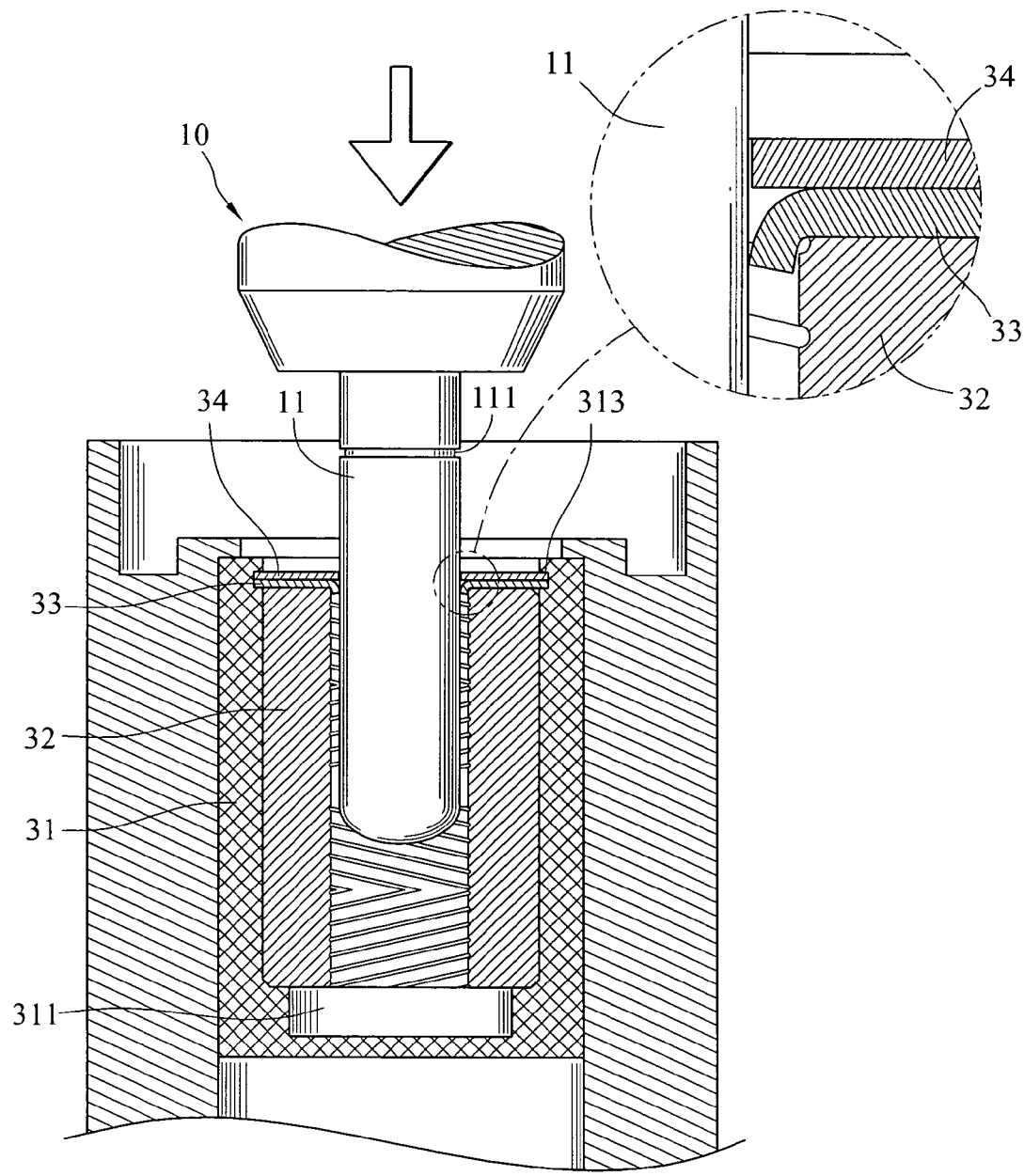
FIG. 5 is a cross-sectional view showing how the axis of the rotor is installed.
Figure 6:
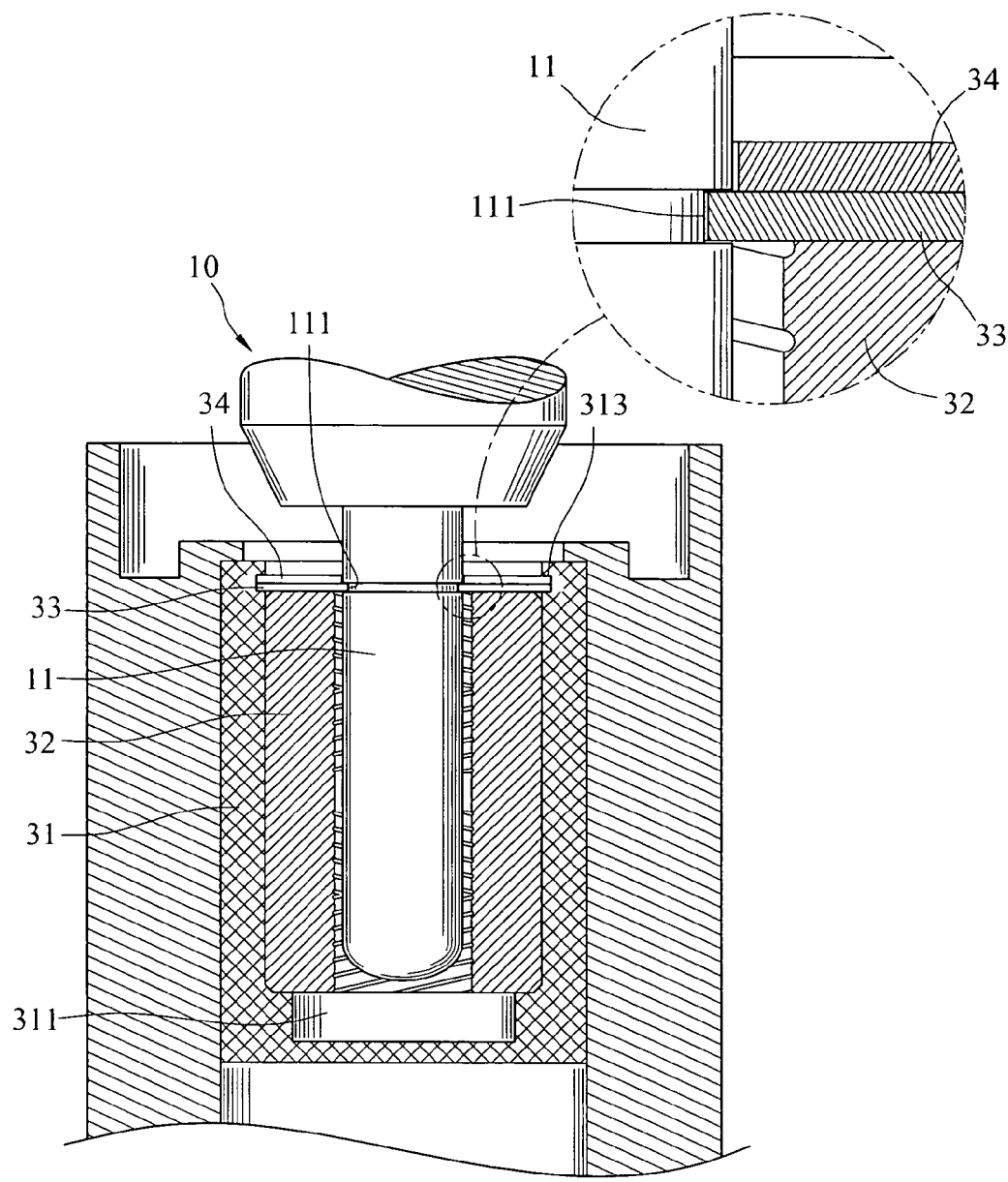
FIG. 6 is a schematic view of the rotor axis installed.
Figure 7:
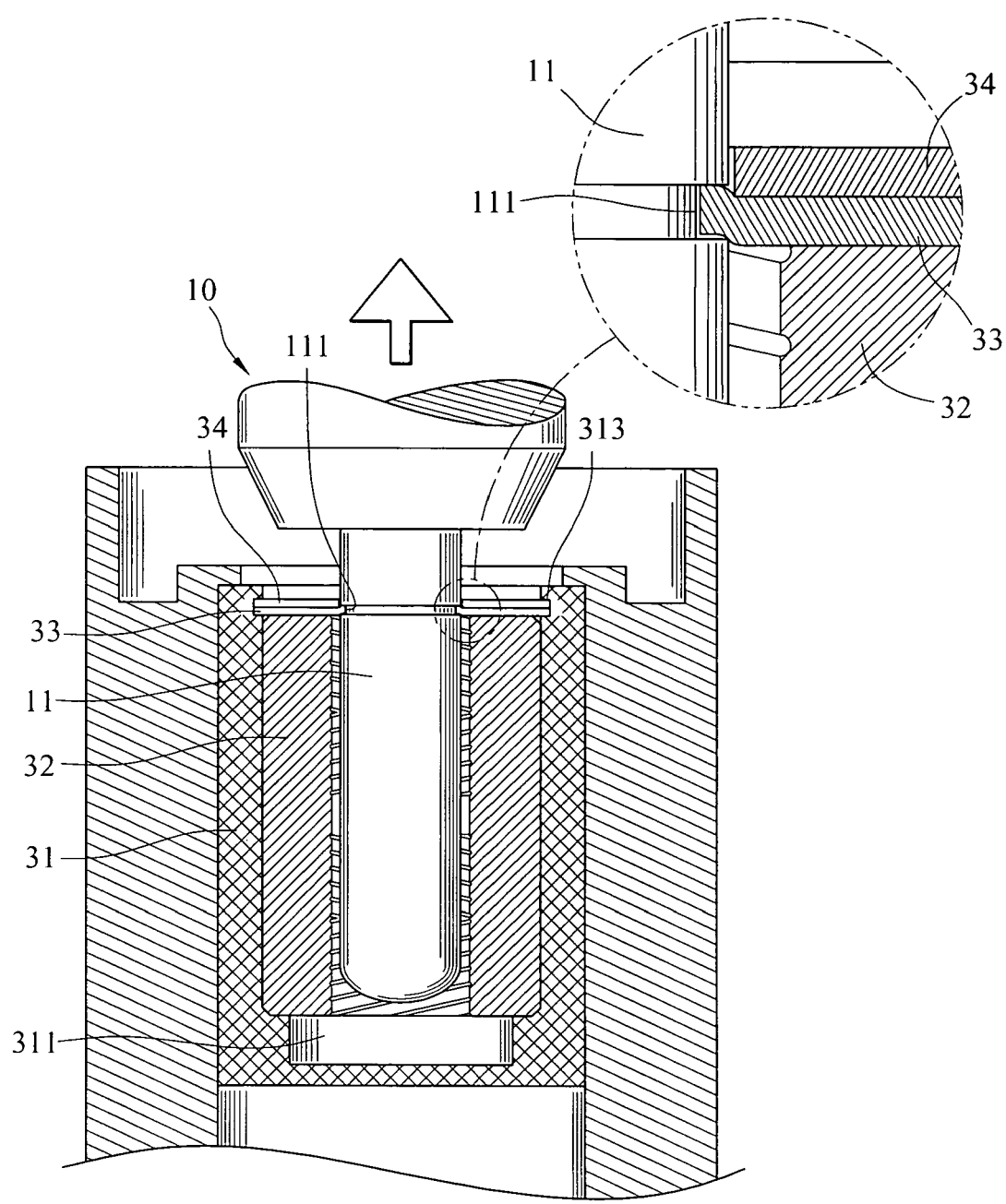
FIG. 7 is a cross-sectional view showing how the axis of the rotor departs from the bearing.

As shown in FIGS. 5, 6 and 7, when the axis 11 goes through the bearing 32, it passes the opening 312, the deflecting member 33 and the impediment 34. The deflecting member 33 then bends towards the capacity 311 until the deflecting member 33 is fixed in the groove 111 of the axis 11. When the axis 11 is departed from the bearing 32, the impediment 34 restricts the deflecting member 33 so that it bends toward the opening 312. This mechanism prevents the axis 11 from getting loose. Moreover, as the lubricant medium is restricted by the maze channel formed by the deflecting member 33 and the impediment 34, the invention can effectively avoid lubricant medium leaking.

Figure 8:
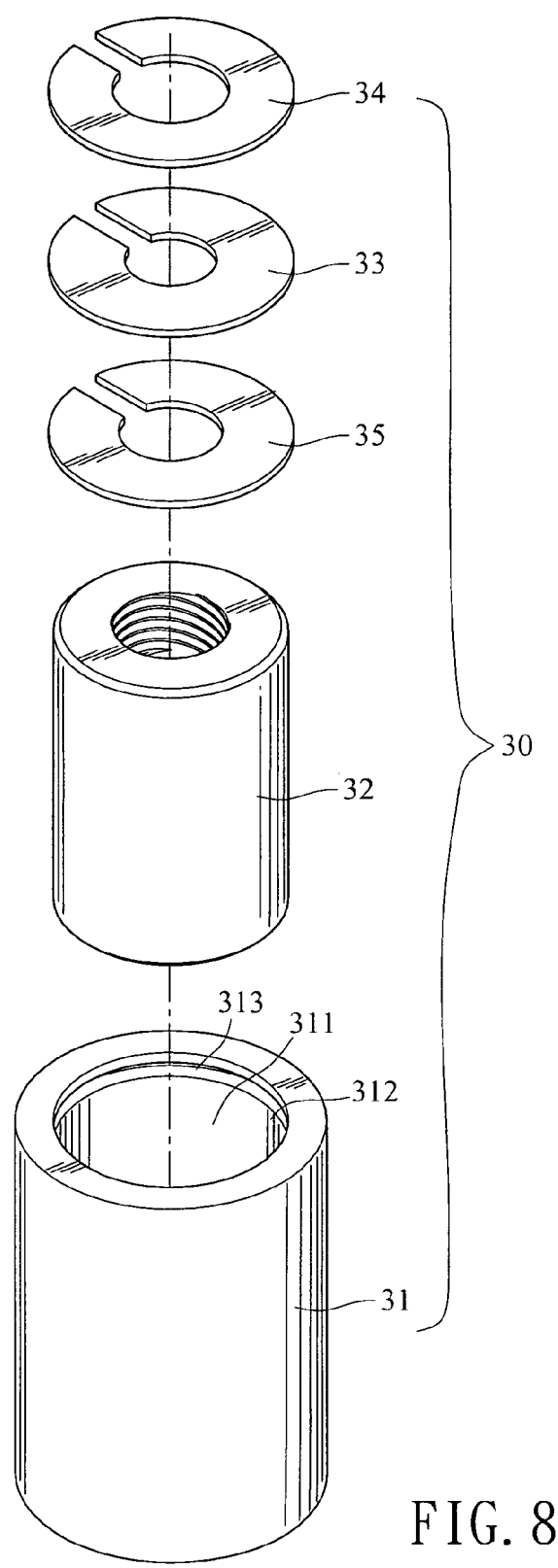
FIG. 8 is a cross-sectional view of another embodiment of the invention.

FIG. 8 shows a cross-sectional view of another embodiment of the invention. The difference of the current embodiment from the previous one is that another impediment 35 protrudes from the side near the opening 312 of the bearing seat 31. The inner diameter of the second impediment 35 is greater than that of the impediment 34.

Figure 9:
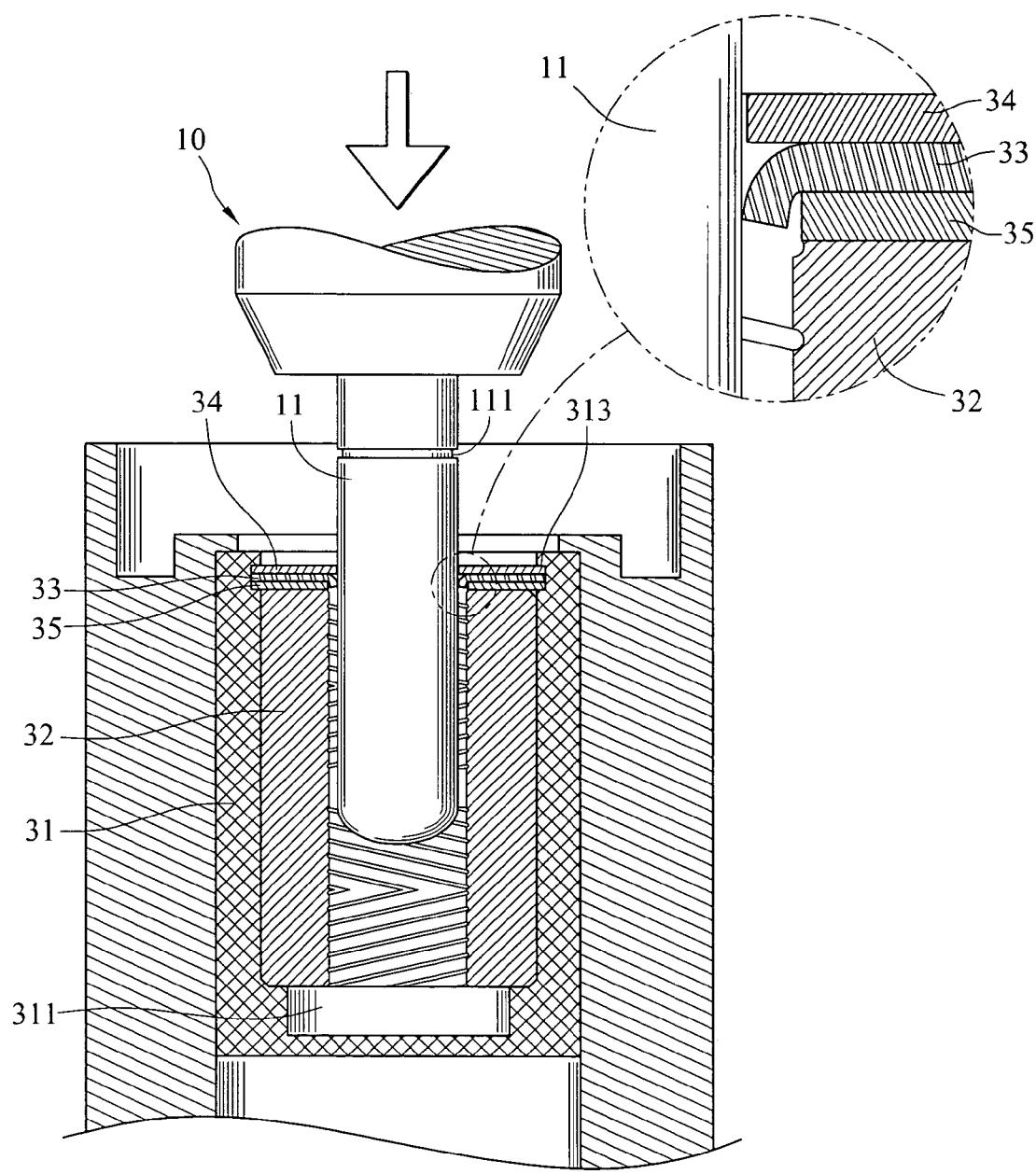
FIG. 9 shows how the axis of the rotor is installed in the second embodiment.
Figure 10:
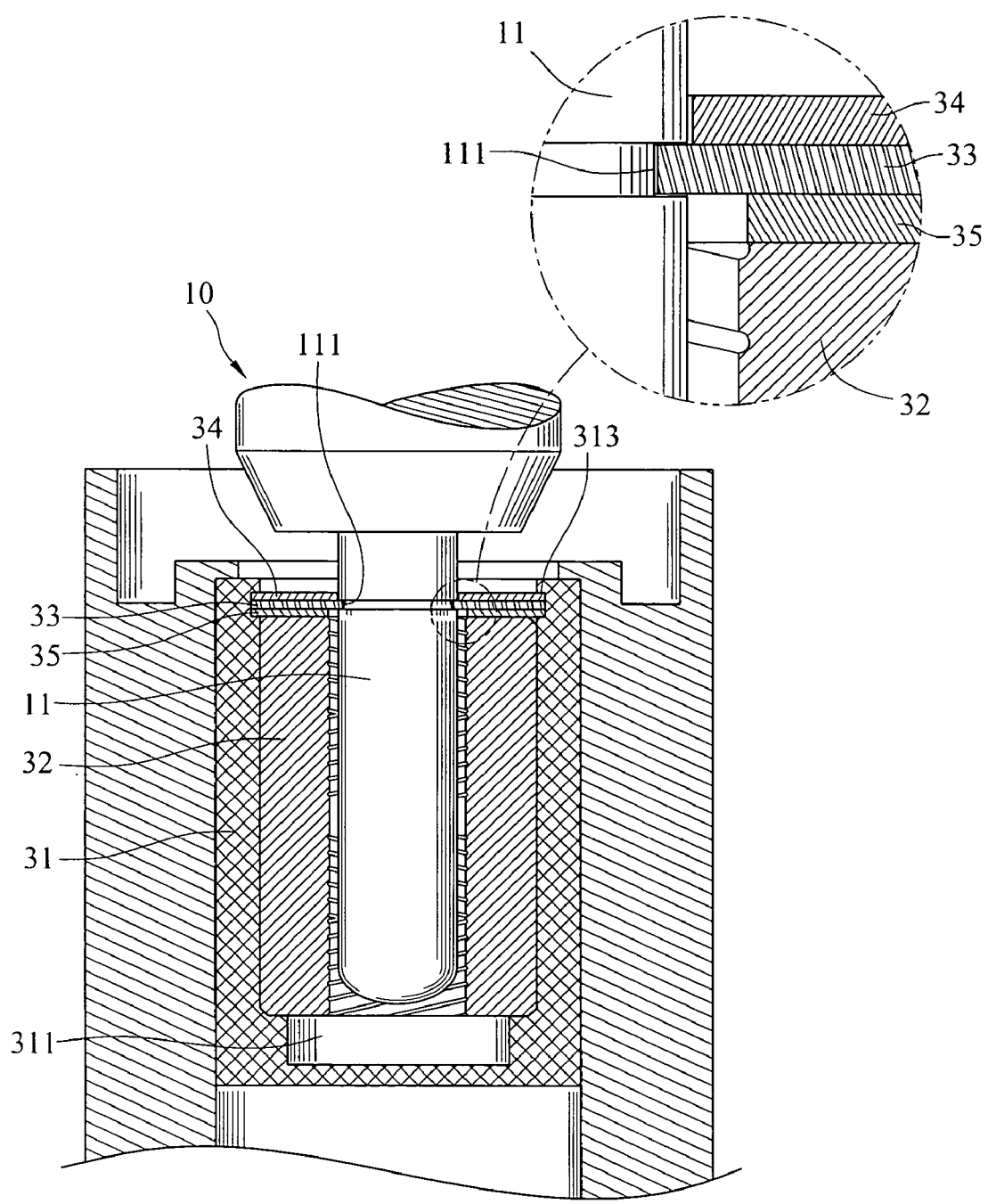
FIG. 10 is a cross-sectional view showing how the axis of the rotor is installed in the second embodiment.
Figure 11:
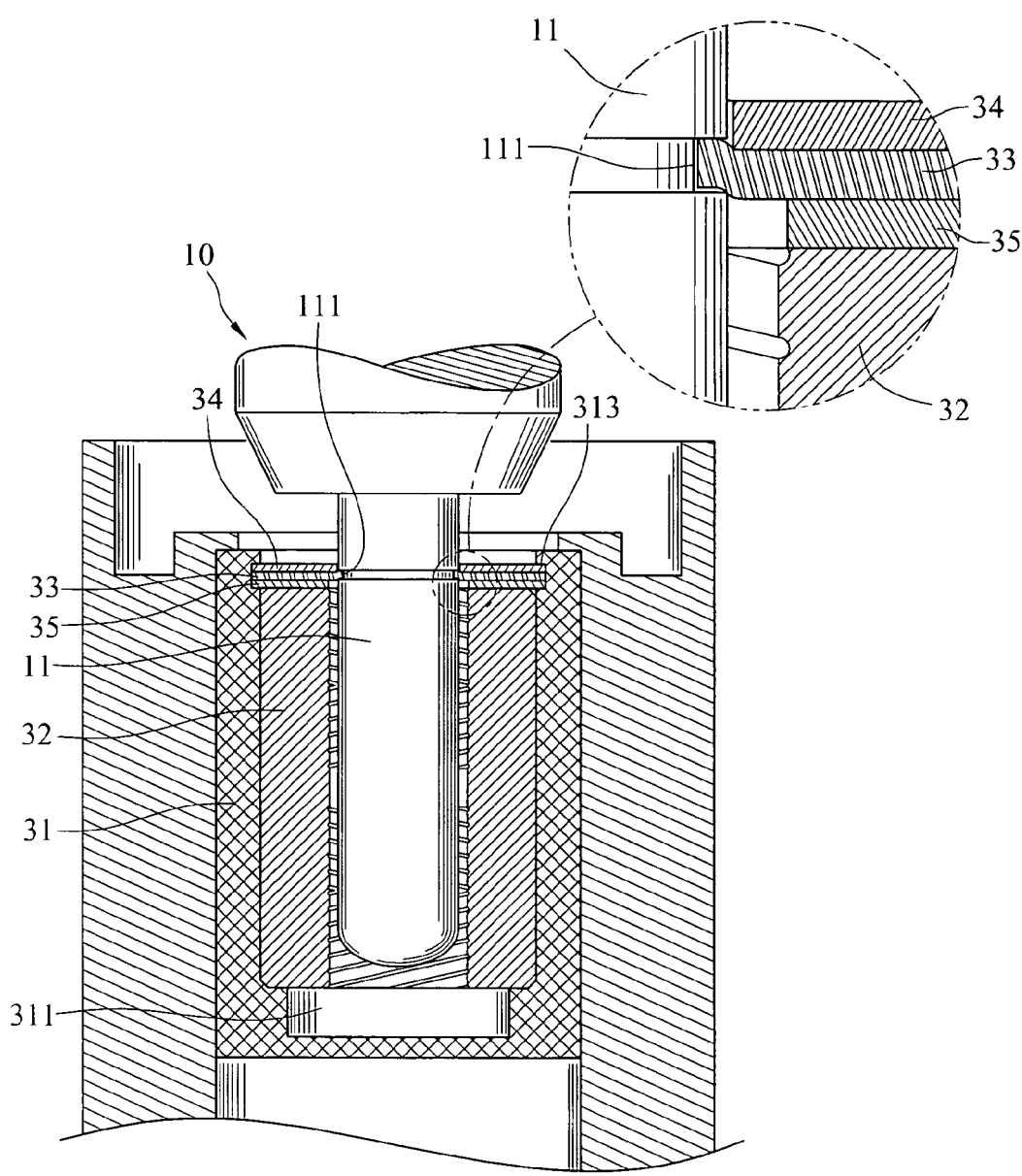
FIG. 11 is a schematic view of the rotor axis installed in the second embodiment.

As shown in FIGS. 9, 10, and 11, when the axis 11 passes through the bearing 32, it goes through the opening 312, the deflecting member 33, the first impediment 34, and the second impediment 35. Under the restriction of the second impediment 35, the deflecting member 33 has a larger bending toward the capacity 311 until it is fixed in the groove 111 of the axis 11. When the axis 11 departs from the bearing 32, the first impediment 34 constrains the deflecting member 33 to bend toward the opening 312. Therefore, the deflecting member 33 can only make small deflection, preventing the axis from getting loose. Again, the lubricant medium is prevented from leaking because of the maze channel formed by the first deflecting member 33, the first impediment 34, and the second impediment 35.

Obviously, the numbers of required deflecting members 33 and impediments 34 in the invention can vary so that the maze channel is more meander to prevent leaking and to make it harder for the axis to depart from the bearing 32.

Certain variations would be apparent to those skilled in the art, which variations are considered within the spirit and scope of the claimed invention.

What is claimed is:

1. A fluid bearing module comprising:
    a bearing seat, which is selectively installed on a stator and has a capacity and an opening connecting to the capacity;
    a bearing, which is installed in the capacity of the bearing seat and has a hollow space for selectively installing an axis of a rotor, with a lubricant medium filled between the bearing and the rotor and the rotor connecting to the stator in a rotatable way;
    a deflecting member, which protrudes from the side of the opening of the bearing seat and buckles in a groove of the axis, bending toward and away from the capacity; and
    a first impediment, which protrudes from the side of the opening of the bearing seat and has an inner diameter greater than the inner diameter of the deflecting member to restrict the deflecting member from bending toward the opening and to prevent the axis from departing;
    a second impediment protruding from the opening side of the bearing seat near the capacity and having an inner diameter greater than the inner diameter of the impediment;
    wherein the deflecting member and the first impediment and the second impediment form a maze channel to keep the lubricant medium within.

2. The fluid bearing module of claim 1, wherein the bearing seat has an annular groove for installing the deflecting member and the first impediment.

3. The fluid bearing module of claim 2, wherein the deflecting member is a buckle ring.

4. The fluid bearing module of claim 2, wherein the first impediment and the second impediment is a buckle ring.

5. The fluid bearing module of claim 1, wherein the deflecting ability of the deflecting member is greater than that of the first impediment and the second impediment.

* * * * *